June 26, 1956     H. MARTIN     2,752,074
GREASE GUNS
Filed Feb. 9, 1953
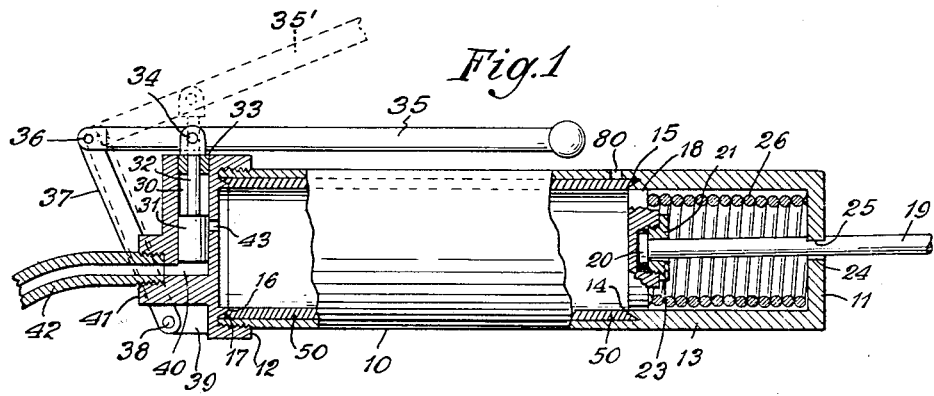
Fig.1
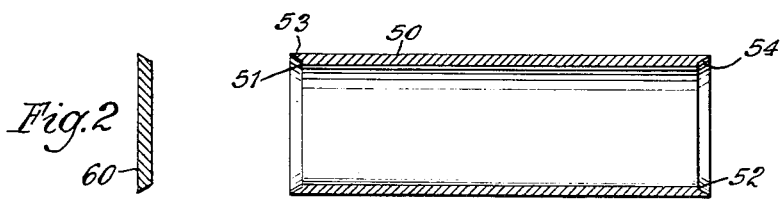
Fig.2     Fig.3
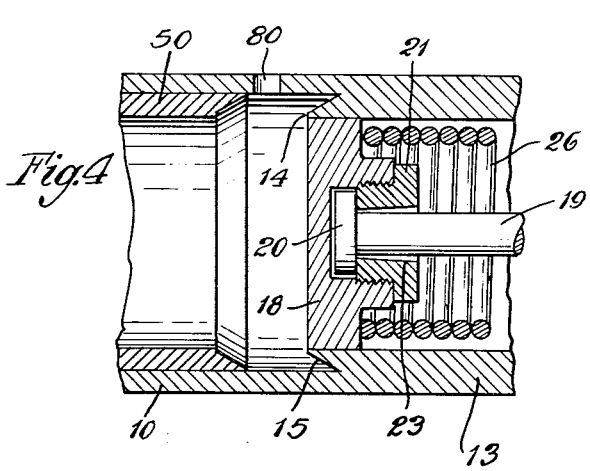
Fig.4
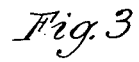
Fig.7
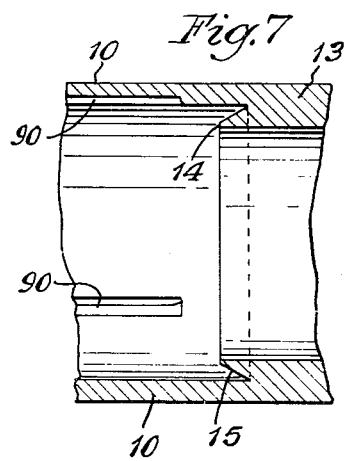
Fig.6     Fig.5
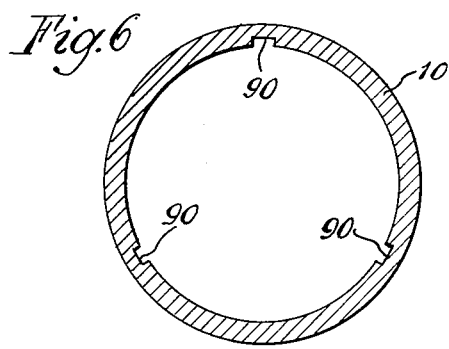
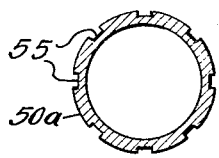
Inventor
Henry Martin
by Harry (signature)
Attorney

United States Patent Office 2,752,074
Patented June 26, 1956

2,752,074

GREASE GUNS

Henry Martin, Chatsworth, Ill.

Application February 9, 1953, Serial No. 335,642

4 Claims. (Cl. 222—326)

This is a continuation-in-part of my patent application Serial No. 281,413, filed April 9, 1952, now Patent No. 2,717,724.

The invention relates to grease guns, and more particularly to grease guns of the type which is charged by insertion of a cartridge filled with grease.

The object of the invention is to provide a grease gun of the type indicated having means for escape of air from within the gun during insertion of a filled grease cartridge therein.

Another object of the invention is to provide a grease gun of the kind indicated having a barrel provided with an air escape opening adjacent an abutment shoulder therein for the rear end of a grease cartridge.

A further object of the invention is to provide a grease gun of the type indicated having a barrel provided with one or more interior grooves extending from a point adjacent an abutment shoulder for a grease cartridge therein towards the front end of the barrel to connection with the atmosphere.

Still another object of the invention is to provide, in a grease gun of the type indicated, a grease cartridge having a groove, or grooves, in the outer surface thereof extending from end to end of said cartridge to form escapement passages for air during insertion of the cartridge.

Other objects and advantages of the invention will be evident from the following description in conjunction with the accompanying drawing, in which Fig. 1 shows an elevation of a grease gun incorporating the invention, certain parts thereof being shown in a longitudinal section through the axis of the gun, Fig. 2 is a cross-sectional view of an end cover for a grease cartridge, Fig. 3 shows a longitudinal axial section of a grease cartridge, Fig. 4 shows a partial axial section of the grease gun with a grease cartridge partly inserted, and Figs. 5, 6 and 7 are cross sectional detail views of modified embodiments of the invention.

The grease gun shown in the drawing comprises a cylinder, or barrel, 10 closed at one end which for convenience of reference will be called the rear end, by an end cover 11 and at the opposite end by a screw cap 12. The rear portion of the barrel 10 has a reduced inner diameter, as shown at 13, and at the front end of said portion 13 an annular shoulder 14 is formed, said shoulder 14 being provided with an annular groove 15 therein. A similar shoulder 16 and groove 17 are formed on the inside of the screw cap 12.

A plunger 18 is mounted in the barrel 10 for reciprocatory movement longitudinally thereof, and said plunger 18 is provided with a plunger rod 19 having a knob or handle (not shown) on its rear end and a flange 20 on its front end, said flange 20 being held against the plunger 18 with some play by means of a nut 21 having a screw-thread connection with the plunger 18. The aperture for the rod 19 in said nut 21 is tapered, as shown at 23, so as to allow a limited transverse movement of the plunger rod 19.

The plunger rod 19 extends through an opening 24 in the end cover 11 and is provided with a lateral recess 25, the bottom of which can be brought into engagement with the edge of the opening 24 through a slight transverse movement of the rod 19, so as to lock the plunger rod 19 against longitudinal movement. A compression spring 26 rests with one end on the end cover 11 and with its opposite end on the plunger 18.

The screw cap 12 is provided, on its outside, with a well known mechanism for transmitting grease from the gun to the machine part to be greased. Said mechanism comprises a small transverse cylinder 30 containing a reciprocably mounted plunger 31 having a plunger rod 32 extending through a cover 33 to the outside. The plunger rod 32 has a pivot connection 34 with a lever 35, the front end of which has a pivot connection 36 with an arm 37 which, in turn, is provided with a pivot connection 38 with a lug 39 projecting from the screw cap 12.

From the inner end of the cylinder 30 a conduit 40 extends through a boss 41 to connect with a flexible tube 42 screw-threadedly connected to said boss 41. If desired, the arm 37 may be fork-shaped so as to straddle the boss 41, or it can be otherwise shaped in any suitable way to provide a symmetrical arrangement. An aperture 43 is provided in the screw cap 12 which connects the interior of the barrel 10 with the cylinder 30.

A cylindrical grease cartridge 50 is provided with an annular shoulder 51 at one end and with a similar shoulder 52 at its opposite end. Annular extensions 53 and 54, respectively, surround these shoulders 51, 52. It will be noted that the two ends of the cartridge 50 are identical, and the shoulders 51, 52 are spaced so that they engage the shoulders 14 and 16 in the grease gun, when the screw cap 12 is in position on the front end of the barrel 10. The extensions 53, 54 then extend into the grooves 15, 17 referred to above. The inner diameter of the cartridge is equal to the inner diameter of the portion 13 of the barrel 10. The grooves and extensions have a tapered wall, as shown.

The cartridge 50 may consist of any suitable material but is preferably made of cardboard or a similar material. The annular extensions 53, 54, by their engagement in the annular grooves 15, 17, provide a means whereby small irregularities in the cylindrical shape of the cartridge are corrected and prevented from interfering with the smooth working of the plunger 18 when the cartridge 50 is clamped in position in the barrel 10.

A small opening 80 is provided in the barrel 10 a short distance from the shoulder 14 towards the front end of the gun. This opening 80 connects the interior of the barrel 10 with the atmosphere.

Fig. 2 shows a cover 60 for fitting against the shoulder 51 in the cartridge 50 within the annular extension 53. A similar cover (not shown) is provided for the opposite end of the cartridge.

When the grease gun described above is to be refilled, the lever 35 is moved to the position indicated in dotted lines at 35', whereby the plunger 31 is moved upwards so as to provide free communication between the interior of the gun barrel 10 and the atmosphere through aperture 43, cylinder 30, conduit 40, and the flexible tube 42. Since the opening 24 also provides free communication between the barrel and the atmosphere around the plunger rod 19, the plunger 18 can then readily be retracted to the position shown in Fig. 1 against the action of the spring 26. The plunger 18 is locked in this retracted position by engagement of the recess 25 in the plunger rod with the edge of the opening 24, as mentioned above.

The screw cap 12 is then removed and the cartridge 50 is pulled out of the barrel 10 through the open front end thereof. One end cover 60 is removed from a fresh filled grease cartridge 50, and said cartridge is inserted into the barrel 10 with the open end first. This insertion is carried out easily and without resistance, since the air in the barrel 10 between the plunger 18 and the cartridge can escape through the opening 80 in the gun barrel 10 during the insertion of the cartridge up to a point where the inner end portion of the cartridge covers said opening 80 and prevents further escape of air.

During the last portion of the movement of the cartridge into the barrel, a compression of the remaining air occurs but the amount of this air is so small that the compression thereof does not interfere with the completion of the cartridge insertion. Naturally, the front surface of the plunger 18 may be located further to the rear than shown in the drawing in the retracted position of the plunger, so as to provide for less relative compression of the air remaining in the barrel. Or, the spring 26 may be incompletely compressed in the position of the plunger 18 shown in Fig. 1, so as to allow it to be further compressed by the compressed air acting on the plunger, if necessary.

When the cartridge 50 has been completely inserted, the other end cover 60 is removed therefrom and the screw cap 12 is replaced onto the end of the barrel 10. Naturally, if desired both end covers 60 can be removed before inserting the cartridge.

The operation of the gun in use is identical with the operation of a prior art gun without a grease cartridge. In other words, the flexible tube 42 is secured to the machine part to be greased by known means (not shown), the plunger 31 is moved to a position in which it leaves the aperture 43 open, and the plunger rod 19 is released from its engagement with the edge of the opening 24. The spring 26 then drives the plunger 18 forward, until grease has been pressed out through the aperture 43 to fill the conduit 40. The spring 26 is relatively weak and is not able to press the grease into the place to be greased.

The lever 35 is moved to the position shown in full lines in Fig. 1, whereby the plunger 31 presses the grease in front of it out through the tube 42, at the same time closing the aperture 43. The procedure is repeated as necessary.

In the modification shown in Fig. 5, the opening 80 in the gun barrel is omitted and the grease cartridge 50a is provided with grooves 55 extending from end to end of the cartridge.

Figs. 6 and 7 illustrate another modification in which the inner surface of the gun barrel 10 is provided with similar grooves 90. These grooves 90 extend from the front end of the barrel, or from an opening in the wall of the barrel, to a point adjacent the shoulder 14. Obviously, the grooves 55, or 90, provide means for escape of air during the insertion of the cartridge, the grooves 90 being closed at the rear end, when the rear end of the cartridge reaches the end of the grooves, similarly to the opening 80.

The detailed description above is for exemplification only, without other influence upon the scope of protection than required by the limitations in the claims.

What I claim is:

1. In a grease gun, a barrel having a front end and a rear end, covers at both ends of said barrel, an outlet in the front end cover, an annular shoulder in said barrel, inclined so as to form a truncated conical surface having its apex toward the front end of the barrel, a grease cartridge in said barrel having its rear end in engagement with said shoulder, means for ejecting grease through said outlet, and means for escape of air from said barrel during insertion of a filled grease cartridge therein, said escape means being closed by the fully inserted grease cartridge.

2. In a grease gun, a barrel having a front end and a rear end, covers at both ends of said barrel, an outlet in the front end cover, an interior annular shoulder in said barrel inclined so as to form a truncated conical surface having its apex toward the front end of the barrel, a grease cartridge in said barrel having its rear end in engagement with said shoulder, means for ejecting grease through said outlet, and an air escape opening in said barrel adjacent said shoulder towards the front end of said barrel in a position where it is closed by the fully inserted grease cartridge.

3. In a grease gun, a barrel having a front end and a rear end, covers at both ends of said barrel, an outlet in the front end cover, an interior annular shoulder in said barrel inclined so as to form a truncated conical surface having its apex toward the front end of the barrel, a grease cartridge in said barrel having its rear end in engagement with said shoulder, means for ejecting grease through said outlet, and at least one groove in the inner surface of said barrel extending from a point adjacent the shoulder to connection with the atmosphere so that said groove is covered by the fully inserted grease cartridge.

4. In a grease gun, a barrel having a front end and a rear end, covers at both ends of said barrel, an outlet in the front end cover, an interior annular shoulder in said barrel, a grease cartridge in said barrel having its rear end in engagement with said annular shoulder, means for ejecting grease through said outlet, and at least one groove in the outer surface of said cartridge extending from end to end thereof, the rear end of said groove being closed by the engagement between said shoulder and the rear end of said grease cartridge.

References Cited in the file of this patent

UNITED STATES PATENTS

| | | |
|---|---|---|
| 1,269,438 | Hieatzman | June 11, 1918 |
| 1,555,705 | Roberts | Sept. 29, 1925 |
| 1,965,271 | Wharton | July 3, 1934 |
| 2,085,446 | Philippe | June 29, 1937 |
| 2,591,653 | Altiere et al. | Apr. 1, 1952 |